United States Patent [19]

Lehnert

[11] 4,432,011
[45] Feb. 14, 1984

[54] METHOD FOR OPTICAL ALIGNMENT OF A PROJECTION TELEVISION SYSTEM

[75] Inventor: Stanley E. Lehnert, Addison, Ill.

[73] Assignee: Zenith Radio Corporation, Glenview, Ill.

[21] Appl. No.: 350,467

[22] Filed: Feb. 19, 1982

[51] Int. Cl.³ .............................................. H04N 9/31
[52] U.S. Cl. .................................................. 358/60
[58] Field of Search ..................................... 358/60, 10

[56] References Cited

U.S. PATENT DOCUMENTS 3,009,015 11/1961 Bailey et al. .......................... 358/60
4,274,110 6/1981 Lehnert ................................ 358/60

*Primary Examiner*—Richard Murray

[57] ABSTRACT

A method is disclosed for the optical alignment of a projection television system having a bank of three light projection means for projecting into coincidence red, green and blue images to form a composite color image in space. The light projection means which are located off the projection screen axis project purposely distorted off-axis images effective to substantially compensate, upon projection, for the non-linear magnification distortion of the image resulting from the off-axis location. The method of optical alignment comprises replacing the cathode ray tubes of the light projection means with lamp means. A graticular geometrical analog of each of the projected images is interposed between the lamp means and a projection lens means. The analogs are projected consecutively and concurrently on the projection screen and the images are superimposed by manipulating adjustment means which adjust the light projection means in azimuth and elevation; whereby the images projected by the light projection means will be in substantial optical alignment each with the other and with the screen.

6 Claims, 25 Drawing Figures

METHOD FOR OPTICAL ALIGNMENT OF A PROJECTION TELEVISION SYSTEM

CROSS-REFERENCE TO RELATED APPLICATIONS

This application is related to but in no way dependent upon copending applications of common ownership herewith including: Ser. No. 459,004 filed Jan. 17, 1983, a continuation of Ser. Nos. 228,434 filed Jan. 26, 1981; 238,861 filed Feb. 27, 1981; 258,206 filed Apr. 27, 1981; 280,398 filed July 6, 1981; 297,885 filed Aug. 31, 1981; 318,309 filed May 11, 1981; and 314,591 filed Oct. 26, 1981.

BACKGROUND OF THE INVENTION AND PRIOR ART DISCLOSURES

This invention concerns projection television systems utilizing color cathode ray picture tubes, and is particularly directed to systems in which discrete images are projected on a viewing screen to form a composite color picture.

A projection television system of this type is described and fully claimed in referent copending application Ser. No. 459,004. A jack-in-the-box projection television receiver comprises a cabinet for enclosing the components of the receiver, and includes a lid hinged at the back of the cabinet. The receiver includes a vertically arranged, elevatable rear projection screen selectively storable in the cabinet. Image source means provide for forming a television image. Stationary optical assembly means provide for projecting an aerial image of a television image formed by the image source means along a folded optical path onto the screen when the optical path is erected, and the screen is located a predetermined image projection distance from the image source means. The receiver further includes means for elevating the screen from a first receiver-inoperable position wherein the screen is completely enclosed within the cabinet and the receiver is ultra-compact, to an elevated receiver-operable position wherein the screen is emerged from the cabinet. As a result, the optical path is extended to a length equal to the predetermined image projection distance whereby the projection image is coincident with the screen.

In projection television systems having image projection devices positioned off the axis of the viewing screen, distorted images are projected by the off-axis devices. Two types of optical distortion are present —trapezoidal and horizontal non-linearity. These types are best described by the term "non-linear magnification distortion." In U.S. Pat. No. 4,274,110 of common ownership herewith, means and method are disclosed for compensating for non-linear magnification distortion in projection television systems. The projection television system has a projection screen for displaying a light image cast thereon. The screen is spaced apart from at least one light projection means whose projection optical axis lies at a non-zero, acute-angle A with respect to the screen axis. The light projection means comprises cathode ray tube means having a cathodoluminescent screen on the inside surface of a face panel thereof whose axis is substantially parallel to the projection optical axis. Electron-beam generating means are disposed on the cathode ray tube electron-optical axis for forming an electron image on the cathodoluminescent screen which is converted to a visible image by the cathodoluminescent screen. Lens means on the projection optical axis provide for projecting on the projection screen the light image of the electron-formed visible image. The light image inherently has non-linear magnification distortion attributable to the location of the projection means off the projection screen axis. The system is characterized, according to one embodiment of the invention, by the cathode ray tube electron-optical axis defining a non-zero, acute-angle B with respect to the axis of the cathodoluminescent screen. The value of the angle B and the orientation of the electron optical axis is selected according to the invention to cause the electron-formed visible image to have an orientation and a non-linear magnification distortion effective to substantially compensate for the off-axis-induced non-linear magnification distortion of the projected light image. This patent is fully incorporated herein by reference.

OBJECTS OF THE INVENTION

It is a general object of this invention to provide for the optical alignment of projection television systems having off-the-screen axis image projection devices.

It is a more specific object of this invention to provide for the optical alignment of the projection television system disclosed in referent copending application Ser. No. 459,004.

It is a specific object of the invention to provide for the optical alignment of projection television systems described and claimed in referent U.S. Pat. No. 4,274,110.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
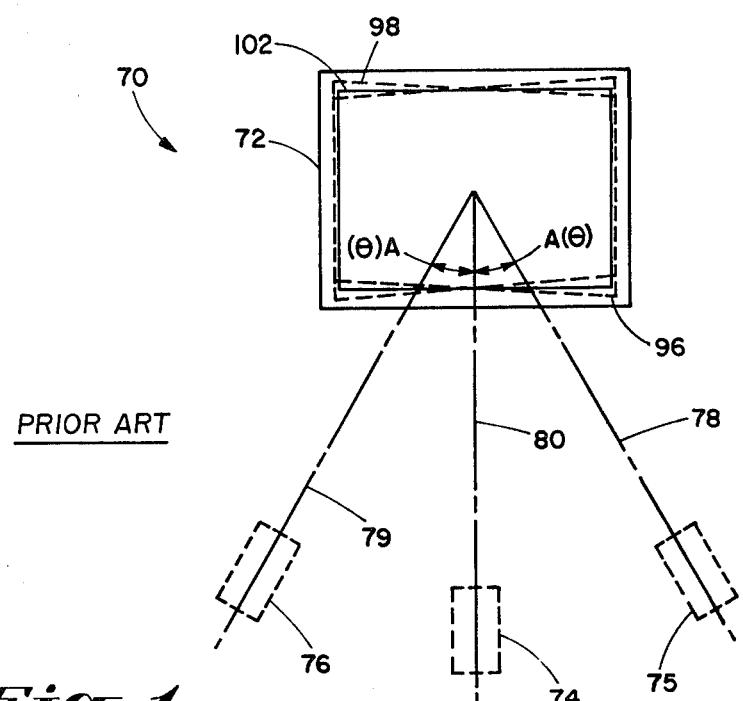
FIG. 1 is a highly simplified schematic representation of a projection television system having off-axis light projection means.

In FIG. 1 there is depicted schematically the essentials of a projection television system. The system 70 has a projection screen 72 for displaying a light image cast thereon. Screen 72 is spaced from a bank of three light projection means 74, 75 and 76 for receiving and displaying a composite color image on screen 72. Two of the light projection means, designated as being projection means 75 and 76, have projection optical axes 78 and 79, respectively, lying at a non-zero, acute-angle A with respect to the viewing screen axis 80. These are termed "off-axis," or "displaced axis" tubes.

Figure 2:
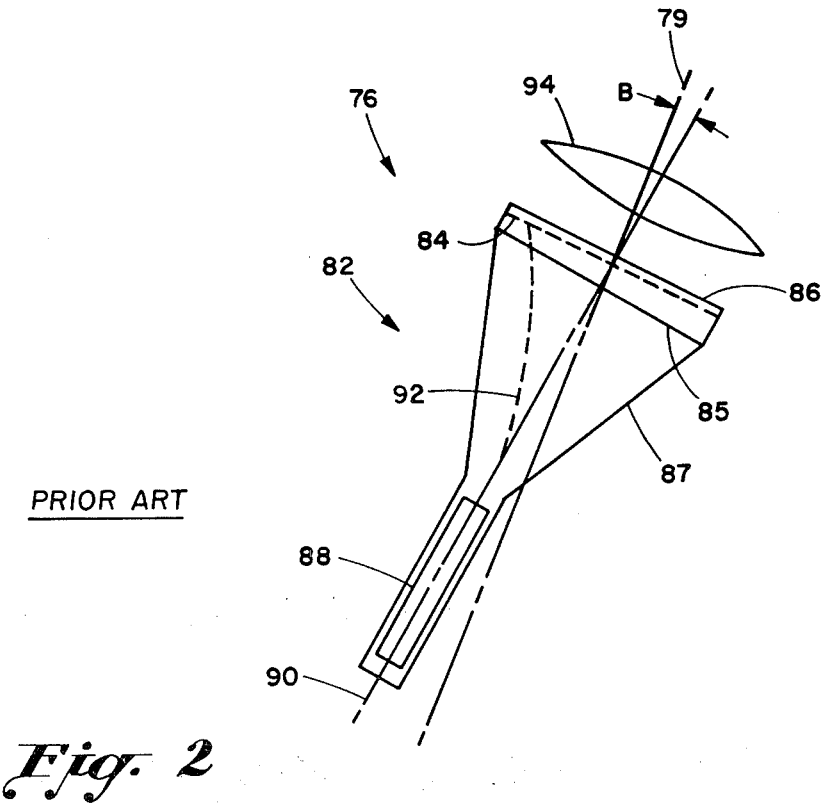
FIG. 2 shows diagramatically and in greater detail one such off-axis projection means.

With reference also to FIG. 2 wherein off-axis projection means 76 is depicted in greater detail, projection means 76 is indicated as including a cathode ray tube means 82 having a cathodoluminescent screen 84 on the inside surface of the face panel 86 whose axis is substantially parallel to the projection optical axis 79. The seal land 85 indicates the junction of the seal edge of face panel 86 and the seal edge of funnel 87 of cathode ray tube 82; the significance of the seal edges and the seal land 85 and their orientation is described in the referent '110 patent. The screen is made cathodoluminescent by a deposit of a monochrome phosphor which may comprise, for example, one of a number of phosphors emitting red, green or blue light upon excitation by an electron beam. The electron beam generating means 88, which is typically an electron gun, is disposed on the electron-optical axis 90 of cathode ray tube 82. Electron beam generating means 88 is indicated as emitting a scanning electron beam 92 which forms an electron image on the cathodoluminescent screen 84 in response to television signal information. The electron image is converted to a visible image by cathodoluminescent screen 84 as screen 84 is excited by beam 92.

Lens means 94 on projection optical axis 79 provides for projecting on projection screen 72 the light image of the electron-formed visible image on cathodoluminescent screen 84. The light image inherently has a non-linear magnification distortion attributable to the location of projection means 76 off the viewing screen axis 80.

Two types of optical distortion are inherent in the system which can degrade through misconvergence the composite projected image to the point of unacceptability. As noted, the two types are trapezoidal distortion and horizontal non-linearity distortion, and are best described by the single term "non-linear magnification distortion." Two non-linear magnification distortion exhibited by the light images projected on viewing screen 72 by light projection means 75 and 76 is shown in FIG. 1 as comprising, respectively, trapezoidally distorted images 96 and 98. An undistorted image 102 is represented by the solid lines. Horizontal non-linearity distortion is also present although not shown. It is manifested as a progressive stretching of the projected image from left to right as projected by projection means 76. Conversely, horizontal non-linear distortion of the image projected by projection means 75 is manifested by a progressive stretching of the image from right to left.

With reference again to FIG. 2, the projection television system according to the invention described and claimed in the referent '110 patent is characterized by the electron-optical axis 90 of cathode ray tube means 82 defining a non-zero, acute-angle B with respect to the axis of cathodoluminescent screen 84. The value of angle B and the orientation of the electron-optical axis is selected to cause the electron-formed visible image to have an orientation and non-linear magnification distortion effective to substantially compensate for the off-axis-induced non-linear distortion of the projected light image. Tubes of this type which are in accord with the invention disclosed in the '110 patent, and which project purposely distorted off-axis images, are referred to colloquially as "tilted face panel tubes."

Figure 3:
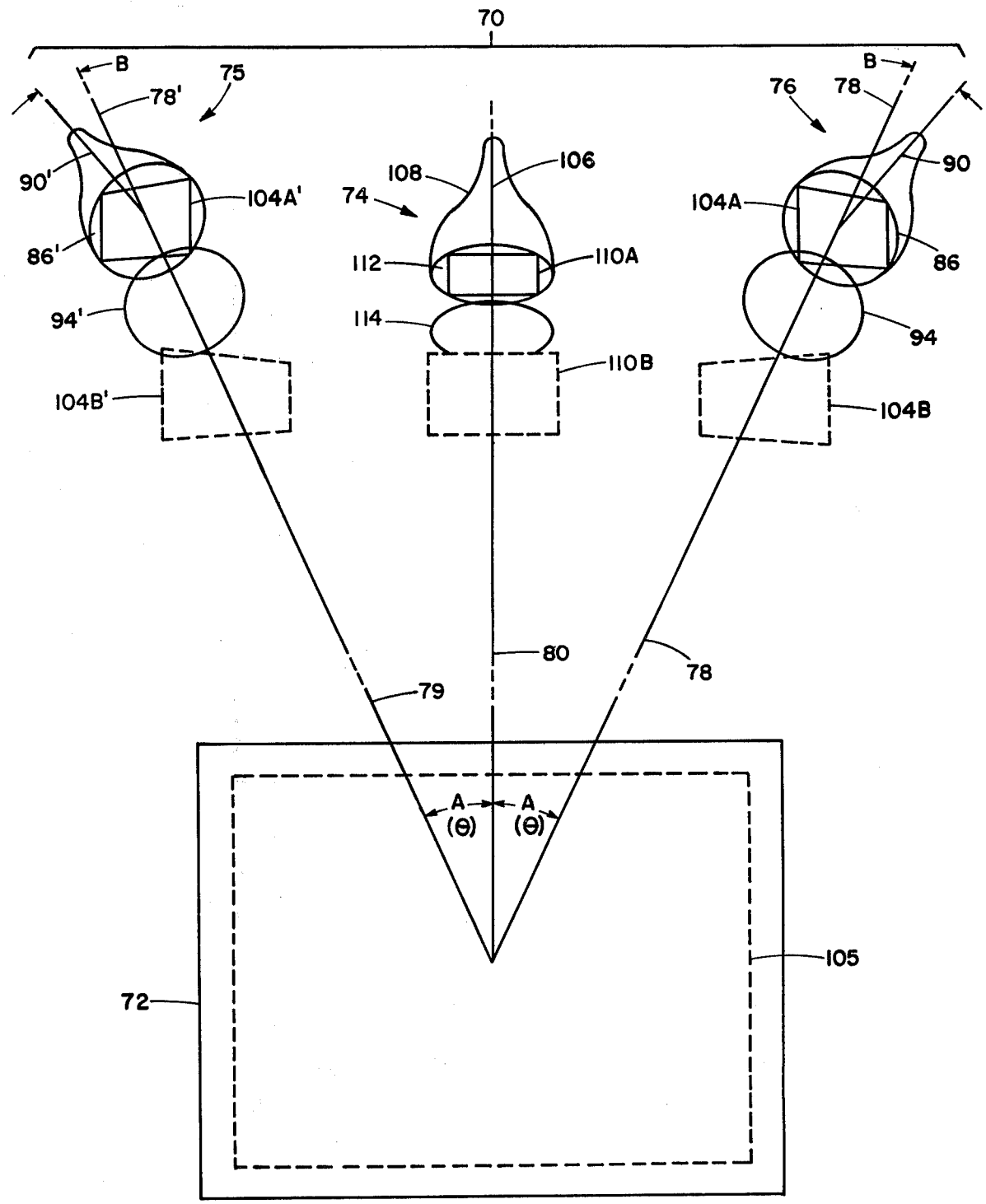
FIG. 3 is a simplified view partially in perspective of a projection television system having three light projection means.

The remedial effect is depicted in FIG. 3, which is view looking over the screen 72 and toward the projection television system 70. The electron-formed visible images 104A and 104A' of these off-axis tubes, which are each adjacent to the central light projection means 74, have an orientation and non-linear magnification distortion effective to substantially compensate, upon projection, for the off-axis-induced non-linear magnification distortion of the projected light image. Images 104A and 104A' are shown as being reversed in orientation by transmission through lens means 94 and 94'. The shapes of the images in space as projected on viewing screen 72 are indicated respectively by light images 104B and 104B', indicated as being "aerial" images by the dash-line configuration. It will be seen that images 104A and 104A' upon projection substantially compensate for the off-axis-induced non-linear magnification distortion, as indicated by the composite image 105 cast on viewing screen 72, depicted as being substantially free of trapezoidal distortion, and which is also free of horizontal non-linearity distortion.

Off-axis light projection means 75 is substantially identical to light projection means 76, and can be considered to be its mirror image, with the orientation of components substantially reversed.

Light projection means 74 is shown as being on-axis; that is, the electron optical axis 106 of the cathode ray tube 108 is congruent with its projection optical axis and the axis 80 of viewing screen 72. Also, the electron-formed visible image 110A of this central light projection means 74 formed on its cathodoluminescent screen 112 is rectilinear. As a result, the aerial image 110B projected by lens means 114 is also undistorted and rectilinear, and the light image cast on screen 72 is in turn rectilinear and in coincidence with the images projected by light means 75 and 76, forming composite image 105. This center tube 108 is referred to as having a "non-tilted face panel."

Figure 4A:
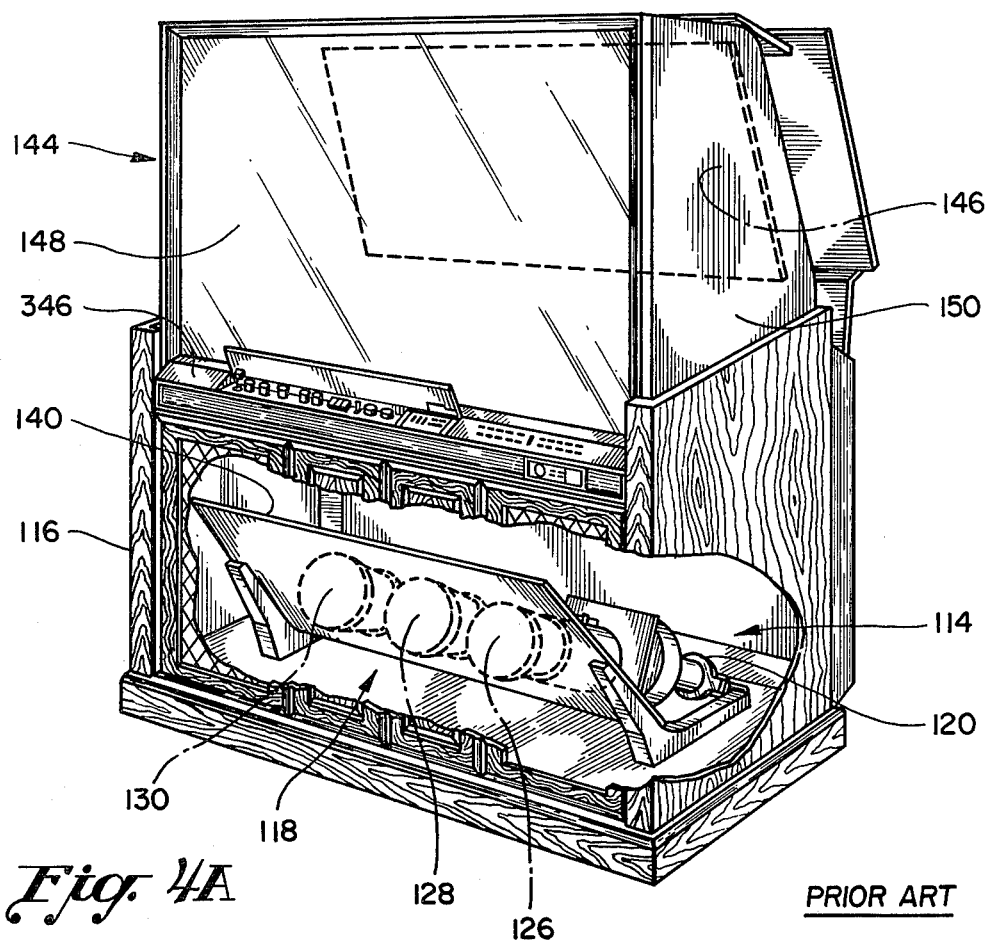
FIG. 4A is an oblique view in perspective depicting a receiver with screen elevated and the receiver cabinet partially cut away to depict the relationship of the major components of the projection optical system according to the invention disclosed in referent copending application Ser. No. 228,434 with the cabinet components.
Figure 4B:
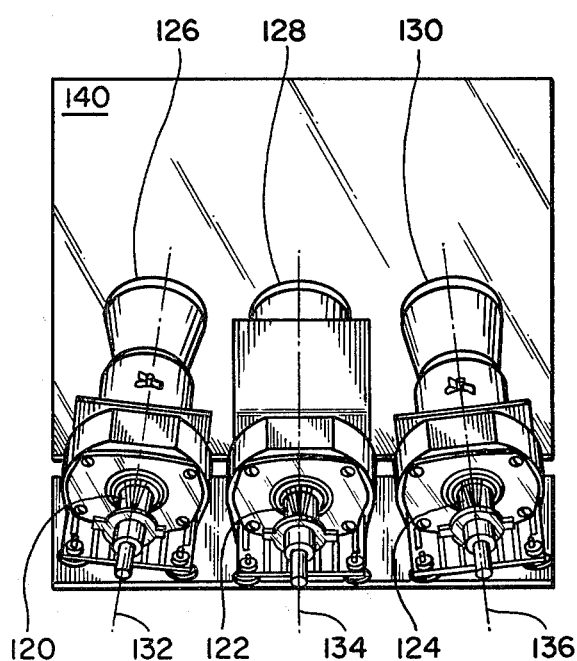
FIG. 4B provides another view in perspective of a major component of the system shown by FIG. 4A.
Figure 4C:
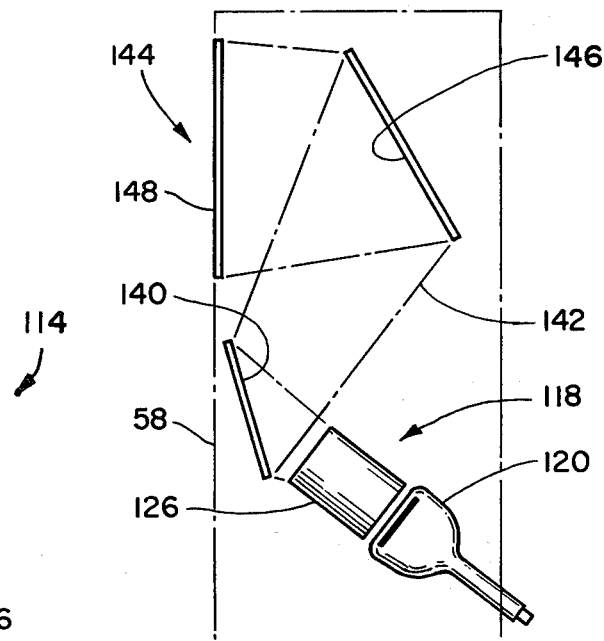
FIG. 4C is a diagrammatic side view of the major components depicted in FIGS. 4A and 4B.

Major components comprising the projection optical system according to the invention are depicted in FIGS. 4A, 4B and 4C. A stationary optical assembly 114 is permanently enclosed in a lower portion of cabinet 116, as shown. Stationary optical assembly 114 has an image projection means 118 including at least one cathode ray picture tube, indicated in this embodiment as comprising three tubes 120, 122 and 124 for forming, respectively, and for example, a red image, a green image, and a blue image analogous to a composite color television picture. Each cathode ray tube 120, 122 and 124 has an associated projection lens means 126, 128 and 130. The tubes 120, 122 and 124 and lens means 126, 128 and 130 are on respective substantially common axes 132, 134 and 136. Lens means 126, 128 and 130 project an aerial image of the television image formed by the associated tube a predetermined image projection distance along an optical path folded by optical path folding means. The respective red, green and blue images are projected into coincidence with the others of the images onto a screen of the rear-projection type, to form a composite color image in space for appearance on projection screen 72. Stationary optical assembly 114 is fully described and claimed in referent copending application Ser. No. 314,591.

The stationary optical assembly 114 also includes a first mirror means 140, depicted as being closely adjacent to image projection means 118, that provides for receiving the aforedescribed aerial images. First mirror means 140 is oriented at a predetermined angle effective to reflect the aerial images steeply upwardly along a folded optical path 142.

The projection system also comprises a protractible optical assembly 144 elevatable as a unit from cabinet means 116. Protractible optical assembly 144 includes a second mirror means 146 shown as being located over image projection means 118. Second mirror means 146 provides for receiving the aerial images reflected from first mirror means 140, and is at a predetermined angle effective to reflect the aerial images forwardly.

The protractible optical assembly 144 also includes rear projection screen means 148 which is vertically arranged for receiving the aerial images reflected from second mirror means 146, as indicated in FIG. 4C by the lines defining a folded optical path 142.

Second mirror 146 and screen 148 are maintained in a predetermined fixed relationship one with the other by shroud means 150 which is made of a structural foam that combines strength and rigidity with light weight.

The protractible optical assembly 144 is formed into a unitary optical assembly by means of shroud 150. This unitary optical assembly is fully described and claimed in referent copending application Ser. No. 238,861.

Figure 5:
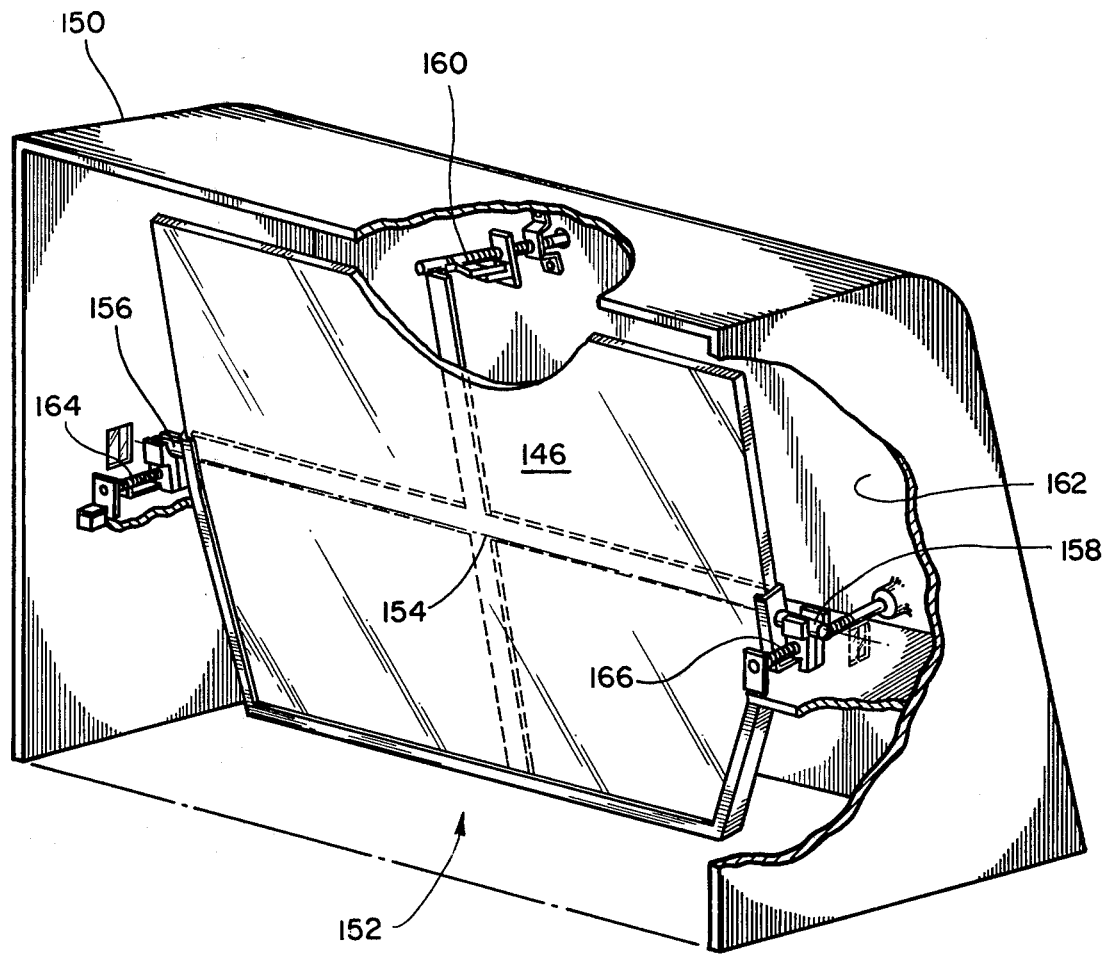
FIG. 5 is a front oblique view in perspective of a shroud member partly cut away to depict an optical mirror and means for its support and adjustment.

Adjustment means are provided so that second mirror 146 can be fixedly adjusted to reflect the projected television image into precise coincidence on screen 148. With reference to FIG. 5, there is shown the components of the optical mirror adjustment means 152 according to the invention disclosed in referent copending application Ser. No. 297,885. Mirror 146 is depicted as being substantially rectangular and having a horizontally oriented major axis 154. Pivot means 156 and 158 are indicated as being located at opposite ends of mirror 146, and parallel with major axis 154 of mirror 146 for tilting mirror 146 in elevation. Screw means 160 provides for coupling mirror 146 and the inner, slanted back section 162 of shroud 150. As screw member 160 is rotated, mirror 146 is tilted on pivot means 156 and 158 to a desired elevational angle. Screw means 164 and 166 provide for coupling, respectively, pivot means 156 and 158 to shroud 150. Rotation of screw means 164 and 166 results in movement of mirror 146 in azimuth, with the adjustments being made from outside the shroud.

Figure 6A:
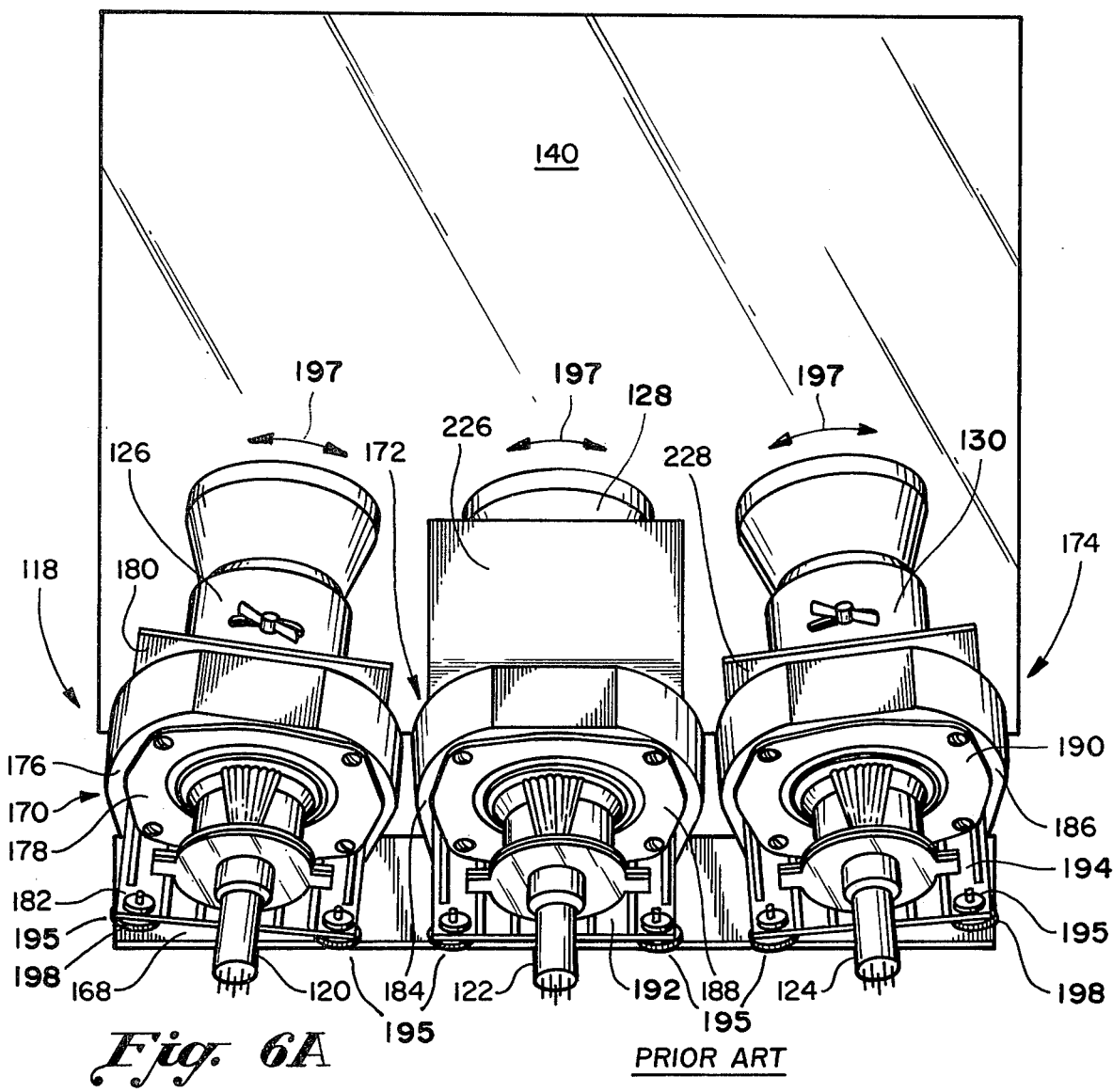
FIG. 6A is a perspective view showing additional details of the component shown by FIG. 4B.

Referring now to FIG. 6A, the image projection means 118 depicted in FIG. 4B is shown in greater detail. The three cathode ray tubes 120, 122 and 124 are indicated as being mounted on a platform 168 so as to project the image developed by the center cathode ray tube straight ahead to the mirror 140, and so that tube 120 and 124 are canted toward the optical path of tube 122. Thus, tubes 120 and 124 project off-axis images onto the mirror 140.

To independently hold each of the tubes in a pre-assigned position for the best optical projection, the tubes are held and mounted on the platform 168 by means of three separate pods 170, 172 and 174. Pod 170, for example, includes a generally cylindrical, hollow housing 176 in which the cathode ray tube 120 is held. Although not shown in FIG. 6A, the housing 176 includes a front opening through which the tube 120 image projects, and a rear opening for receiving and holding the tube, and through which the tube is inserted into the housing 176. The cover 178 mates with the rear of the housing 176 and has a central aperture therein which is sized to fit over the neck of tube 120.

The housing 176 also includes means for supporting a heat sink 180 which is in thermal contact with the face panel of tube 120, and the means for supporting the lens 126. Integrally molded with the housing 176 is a base plate 182 which secures the pod 170 to the platform 168 by means of four bolts, two of which are illustrated.

The pods 172 and 174 are similar to the pod 170 in that they respectively include housings 184 and 186, covers 188 and 190, and integrally molded baseplates 192 and 194 for mounting the pods to the platform 168. Pods 172 and 174 are similar in function to the pod 170 and similar in structure except that the pod 172 holds a normal, "untilted" faceplate tube and pods 170 and 174 hold tubes whose faceplates are "tilted" in opposite directions, according to the invention disclosed in U.S. Pat. No. 4,274,110.

Figure 6B:
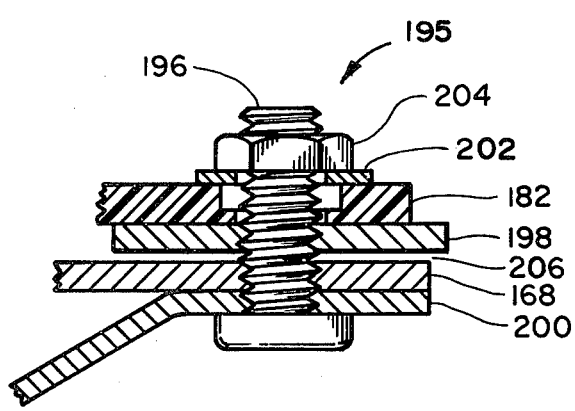
FIG. 6B is a cross-sectional view showing in greater detail an adjustment means depicted in FIG. 6A.

Associated with each pod is adjustment means consisting of leveling means 195 and slot means for adjusting the optical centering and alignment of the associated tube to provide a converged image on the viewing screen. The adjustment means enables pod adjustments to be made in azumuth and elevation. The leveling means is preferably included as a part of the structure which attaches a pod to the base 168. In the illustrated embodiment depicted in FIG. 6B, the bolts such as bolt 196 capture a leveling wheel 198 between the platform 168 and the pod baseplate 182.

Bolt 196 is depicted as passing bracket 200 which may support the platform 168. The leveling wheel 198 is situated above the platform 168, and the baseplate 182 of pod 170 is situated between a washer 202 and the leveling wheel 198. A nut 204 holds this entire assembly securely together.

To adjust the elevation of the pod 170 and associated tube 120, the leveling wheel 198 is manually rotated to vary a space 206 between the baseplate 182 and the platform 168 and, when the space is adjusted to its desired height, the nut 204 is tightened. Each pod preferably includes at least two of these identical leveling wheel assemblies for making adjustments in elevation, as depicted in FIG. 6A.

For adjusting the pods and associated tubes in azimuth, transverse slots and associated nuts and bolts (not shown) are provided at the front of each of the base plates 182, 192 and 194. The slots provide for rotational movement of the pods and associated cathode ray tubes, as indicated by the arrows 197. When proper azimuthal adjustment is attained the respective bolts which pass through holes in a platform 168, provide for clamping the baseplates 182, 192 and 194 to the platform 168 when the respective nuts are tightened.

Figure 7C:
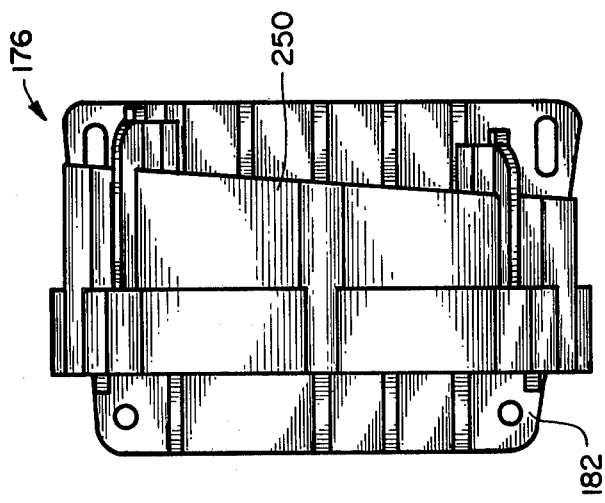
FIGS. 7A–7C are, respectively, a front, side and assembled view in elevation of a cathode ray tube holding means.
Figure 7D:
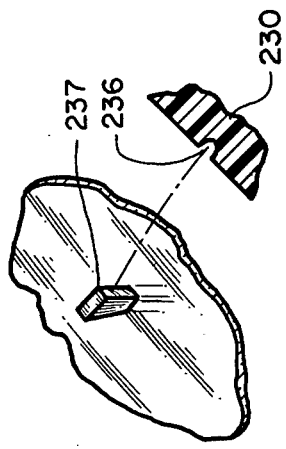
FIG. 7D is a view in perspective depicting details of tab-and-slot means for rotational adjustment of cathode ray tubes.
Figure 7B:
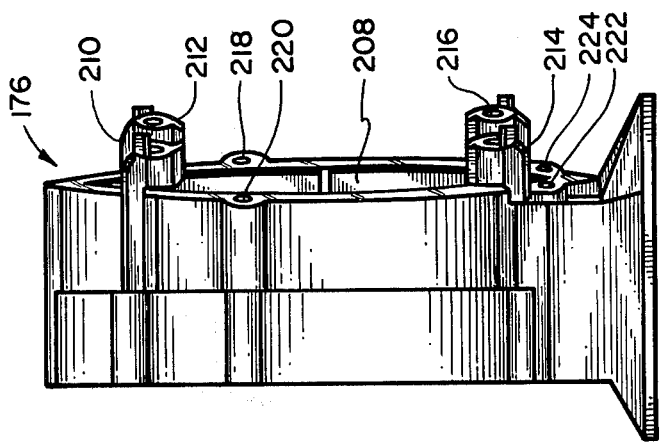
Figure 7A:
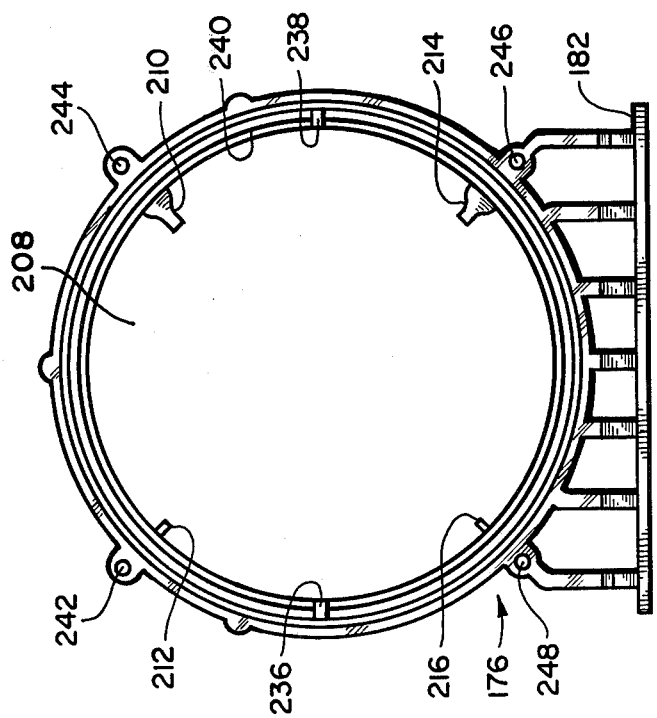

Referring now to FIGS. 7A, 7B and 7C, the housing 176 for the leftmost pod 120 is shown in greater detail. As shown most clearly in FIG. 7B, the housing 176 includes a front opening 208 around which four fingers 210, 212, 214 and 216 are disposed. These fingers extend outwardly from the housing to engage and hold the lens 126 in optical alignment with the screen of cathode ray tube 120 (FIG. 6A). Holes in the heat sink 180 permit these fingers to pass through the heat sink.

To hold the heat sink 180, the housing includes four holes 218, 220, 222 and 224 for receiving self-threading screws which secure the heat sink 180 to the housing 178 and hold it in contact with the cathode ray tube face panel.

Figures 8A, 8B:
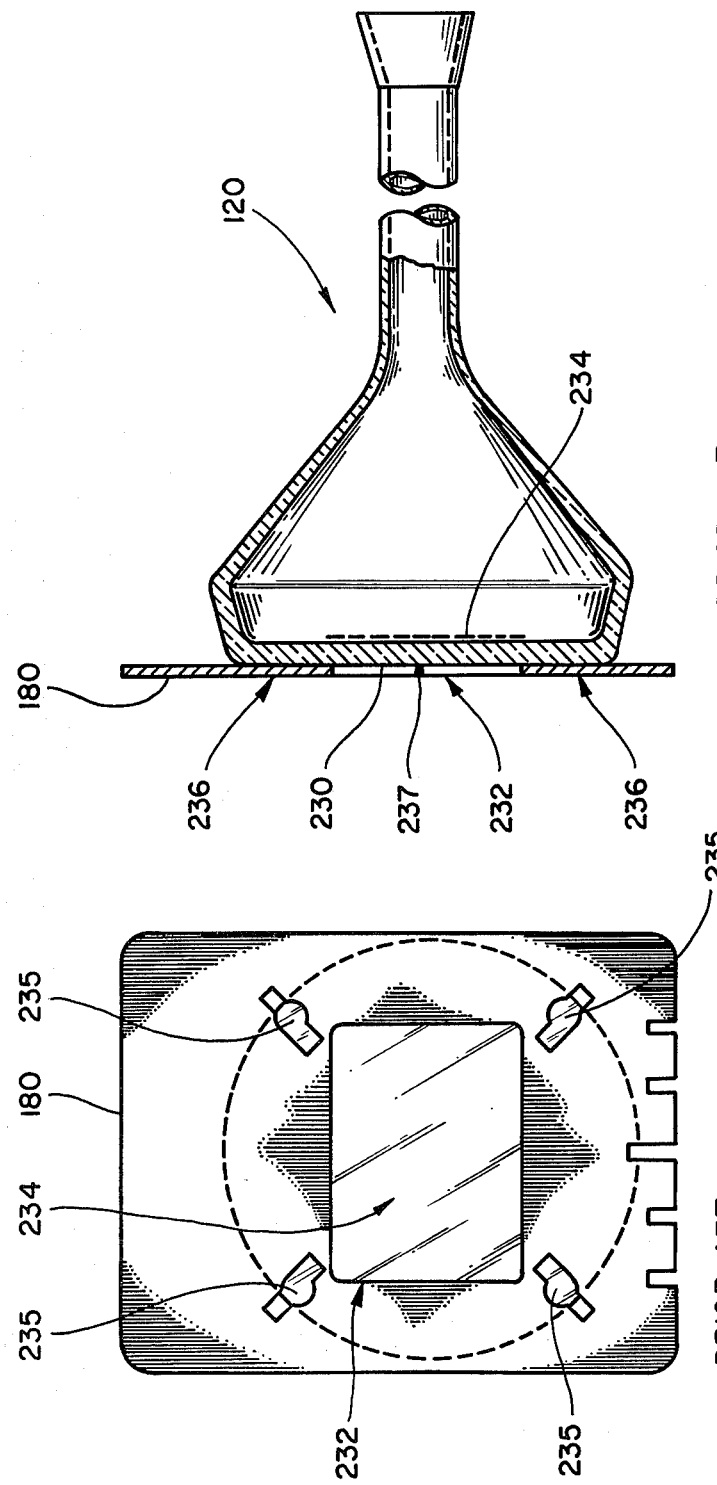
FIGS. 8A and 8B are, respectively, front and side elevational views of a heat sink means and associated cathode ray tube.

With regard to the purpose and function of the heat sink 180, and the other heat sinks 226 and 228 depicted in FIG. 6A, the face panels of cathode ray tubes 120, 122 and 124 are subject to thermally induced cracking due to the high temperature differentials induced in the face panels under electron bombardment during operation of the projection system. With reference to FIGS. 8A and 8B, in which the heat sink 180 for cathode ray tube 120 is described by way of example, heat sink 180 comprises a vertically oriented, rectangular heat-conductive panel. Heat-conductive panel 180, which is preferably made from a metallic sheet, desirably a soft-temper, black-anodized aluminum sheet about one-eighth inch thick, is depicted as being larger in area than face panel 230. Panel 180 is also shown as having a window 232 formed therein that substantially conforms the area of the cathodoluminescent screen 234, which is about three inches by four inches in dimension. The window 232 is in coincidence with screen 234 for passing the television image. Heat-conductive panel 180 is also indicated as being in intimate contact with face panel 230 in the areas 236 of face plate 230 which are outside the area of screen 234. Heat-conductive panel 180 is effective to conduct heat generated under electron bombardment from face panel 230, thus providing for the inhibiting of thermally induced cracking of face panel 230. Apertures 235 provide for receiving the aforedescribed self-threading screws which pass through holes 218, 220, 222 fand 224. Reference No. 237 indicates the presence of a projecting tab on the face panel 230 for indexing with a slot 236 (FIGS. 7A and 7D).

Heat sink 226 will be noted as being larger in area. The purpose is to conduct away from the face panel of cathode ray tube 122 the greater heat developed by tube 122, which forms the green image. The heat sink means are described and claimed in referent copending application Ser. No. 280,398.

As described previously, the outboard pods 170 and 174 hold "tilted" face panel CRTs. These tubes 120 and 124 must be held at the proper rotational positions in their respective pods 170 and 174 so that the aerial images are properly projected onto the viewing screen. Because the tubes in the outboard pods have different "tilts" to their faceplates (the center tube has no tilt), they must be held at different rotational positions. The center tube must be held in its pod without tilt.

Toward this end, each pod 170 and 174 includes indexing means for holding its tube at a preselected rotational position. With reference to FIG. 7A, this indexing means includes at least one and preferably two indexing slots 236 and 238 in a circular flange 240. This flange is located at the front of the housing 176 and extends radially inwardly thereof. When a tube is seated in the housing, the tube face panel abuts the flange 240 so that the face panel is substantially flush with the front opening 208.

The tube which is held by the housing will have one or more indexing tabs which project outwardly from the glass envelope. These tabs, such as the tab 237 in FIG. 7D, are mated with the indexing slots to hold the CRT at the desired rotational positions. Tab 237 is indicated schematically as being mated with slot 236.

Referring to FIG. 7A, the rear of the housing 176 includes threaded holes 242, 244, 246 and 248 for receiving screws which secure the back cover to the housing.

Another important aspect of the housings relates to the way in which their front openings are canted or tilted. As shown most clearly in FIG. 7C, the front opening of the housing 176 is tilted, as shown by the contour line 250. That is, the front of the housing is molded at an angle which matches the tilt embodied in the face panel it holds.

Figure 9:
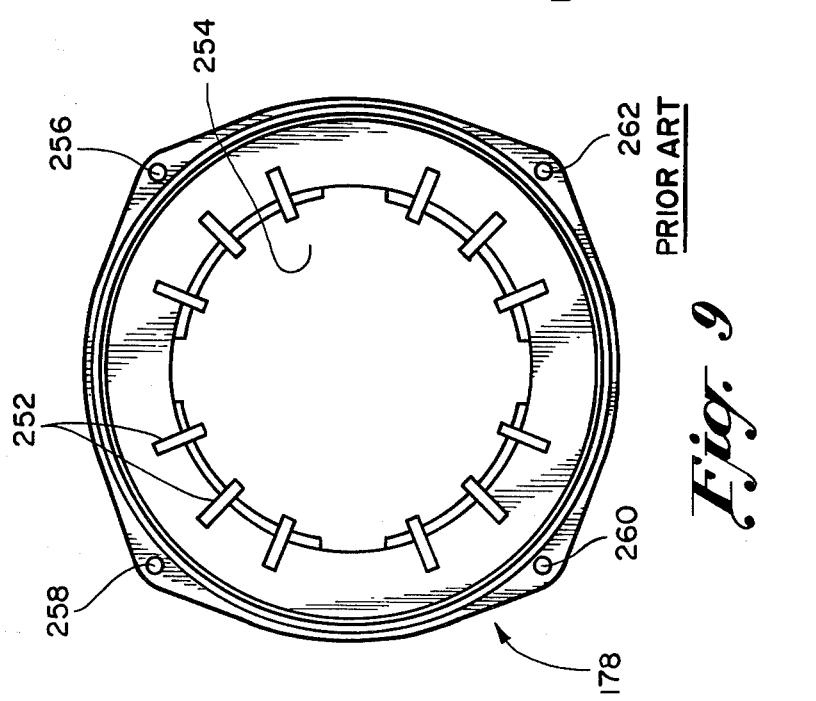
FIG. 9 is an elevational view depicting a cover member for a cathode ray tube holding means.

The rear covers for the three housings may be identical and constructed as shown in FIG. 9 described as being exemplary. The side of the cover 178 which mates with its housing includes ribs 252 which extend radially inward toward the cover central aperture 254. These ribs 252 are included to engage and center a cathode ray tube within its pod. The cover may also include holes 256, 258, 260 and 262 through which screws may pass to secure the cover in its housing.

Figure 10:
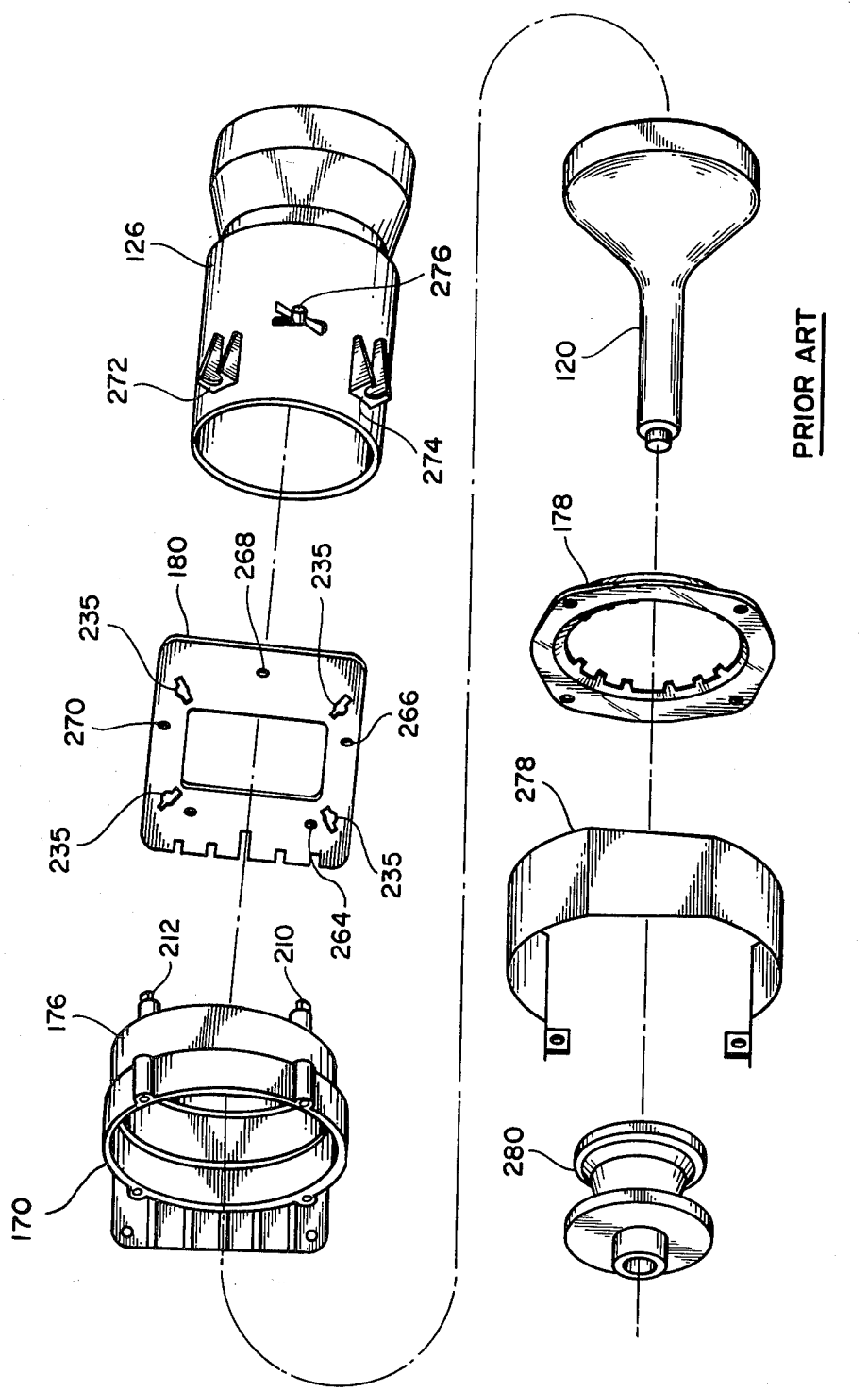
FIG. 10 is an exploded view showing in elevation and in perspective the components of a cathode ray tube and its holding means.

Referring to FIG. 10, an exploded view is shown of the pod 170, its tube, heat sink, and lens. In assembly, the heat sink 180 is mounted to the front of the housing 176, via securing holes 264, 266, 268 and 270 so that the housing's fingers pass through holes 235. The lens 126 is positioned over the heat sink 180 by flanges 272 and 274 which engage fingers 210 and 212 on the housing and then secured by self-threading screws which engage holes in fingers 210 and 212. The focusing of lens 126 is effected by an adjustment knob 276 thereon.

The tube 120 is inserted into the housing 176 and secured therein by the back cover 178. A radiation shield 278 may be included to surround the housing 176. A yoke assembly 280 is normally mounted on the neck of the tube 120.

Figure 11:
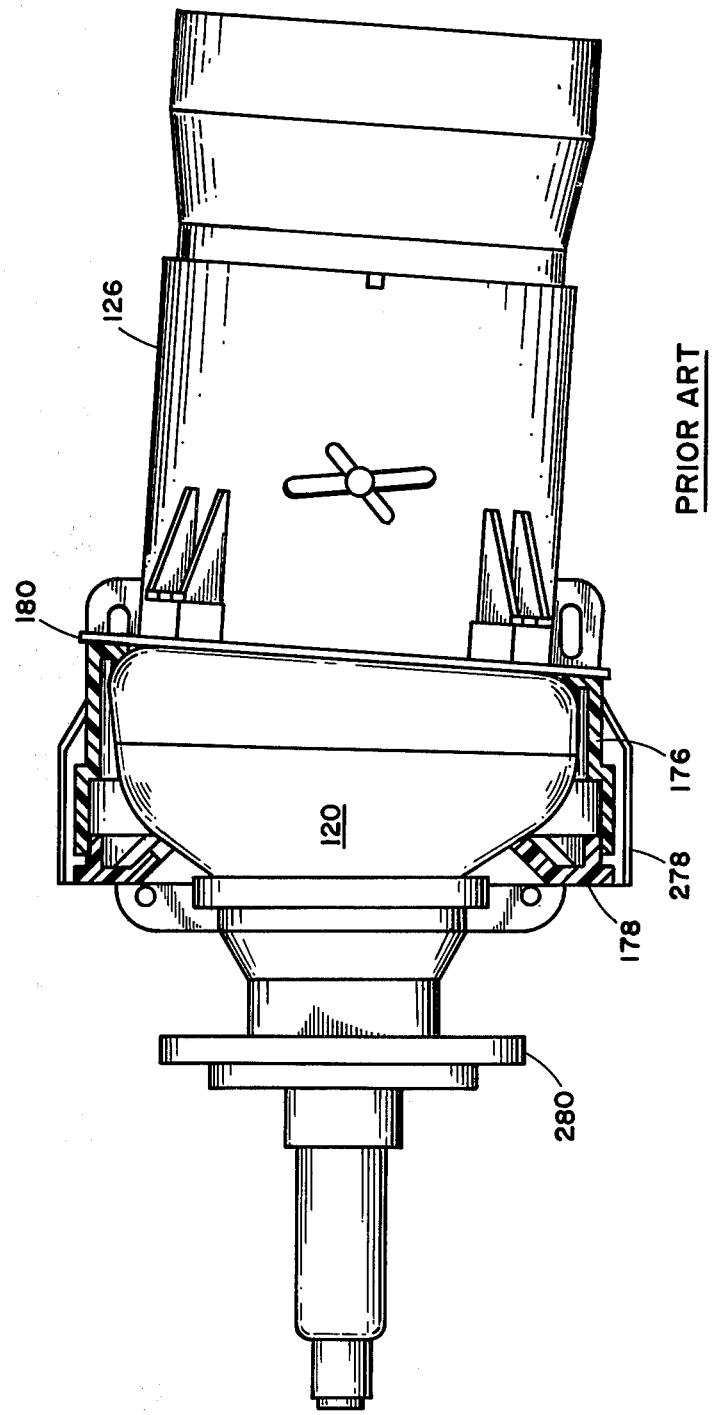
FIG. 11 shows the tube and holding means of FIG. 10 as assembled.

As shown by the completed assembly depicted in FIG. 11, the tilt of the face panel is held in matching alignment with the front opening of the housing 176. In addition, the heat sink 180 is held in contact with the face panel, thereby allowing operation at increased power levels.

Figure 12B:
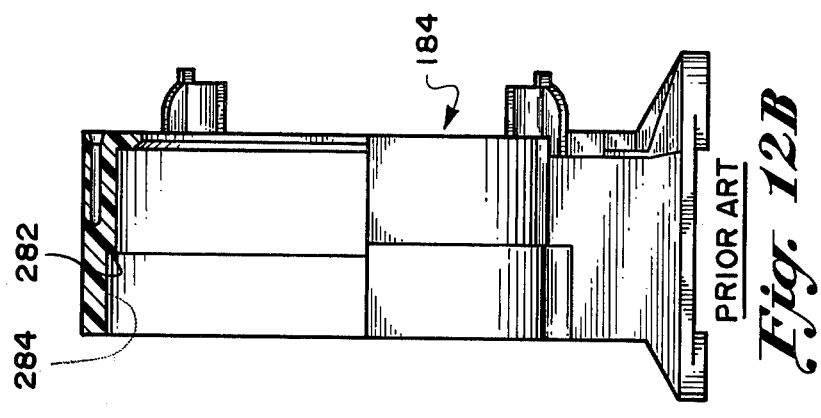
FIGS. 12A and 12B are, respectively, front and side elevational views showing further details of the cathode ray tube holding means.

The housings for the three pods are substantially identical except for the tilt of their front openings and the location of their indexing slots. These parameters for the center pod's housing are shown in FIGS. 12A and 12B to which reference is now made.

Figure 12A:
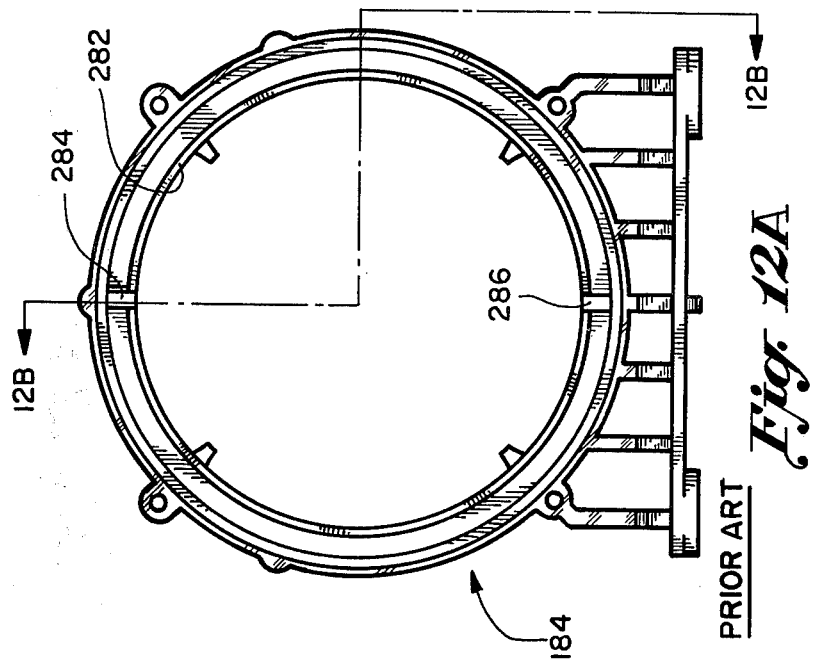

As shown in FIG. 12A, a circular flange 282 around the front opening of the center housing 184 includes indexing slots 284 and 286. These slots are intended to receive indexing tabs carried by a cathode ray tube to hold the tube at a given rotational position. Note that these slots occupy different angular positions than the slots 236 and 238 in the housing 176 (FIG. 7A).

Because the center tube 122 does not have a tilted face panel, the front opening of the housing 184 is also untilted. The other illustrated components of the housing 184 are similar to those discussed previously, and therefore, do not require further explanation.

Among the advantages of the cathode ray tube holding assembly is that each tube is secured in position independently of the other tube. Thus, a defective tube may be replaced without disturbing the alignment of the other tubes.

In addition, the present assembly makes it possible to pre-align all the pods before the tubes are secured in them. Once properly aligned, most optical errors having their origin in a build up of mechanical tolerances are eliminated, and electronic errors may then be eliminated independently.

The method of optical alignment for a projection television system of the type described is set forth in the following paragraphs, with reference to FIGS. 13-17. The method according to the invention may be used for the optical alignment of individual projection television sets such as the one shown and described, or for alignment during manufacture by using the fixture described in the following.

Figure 13:
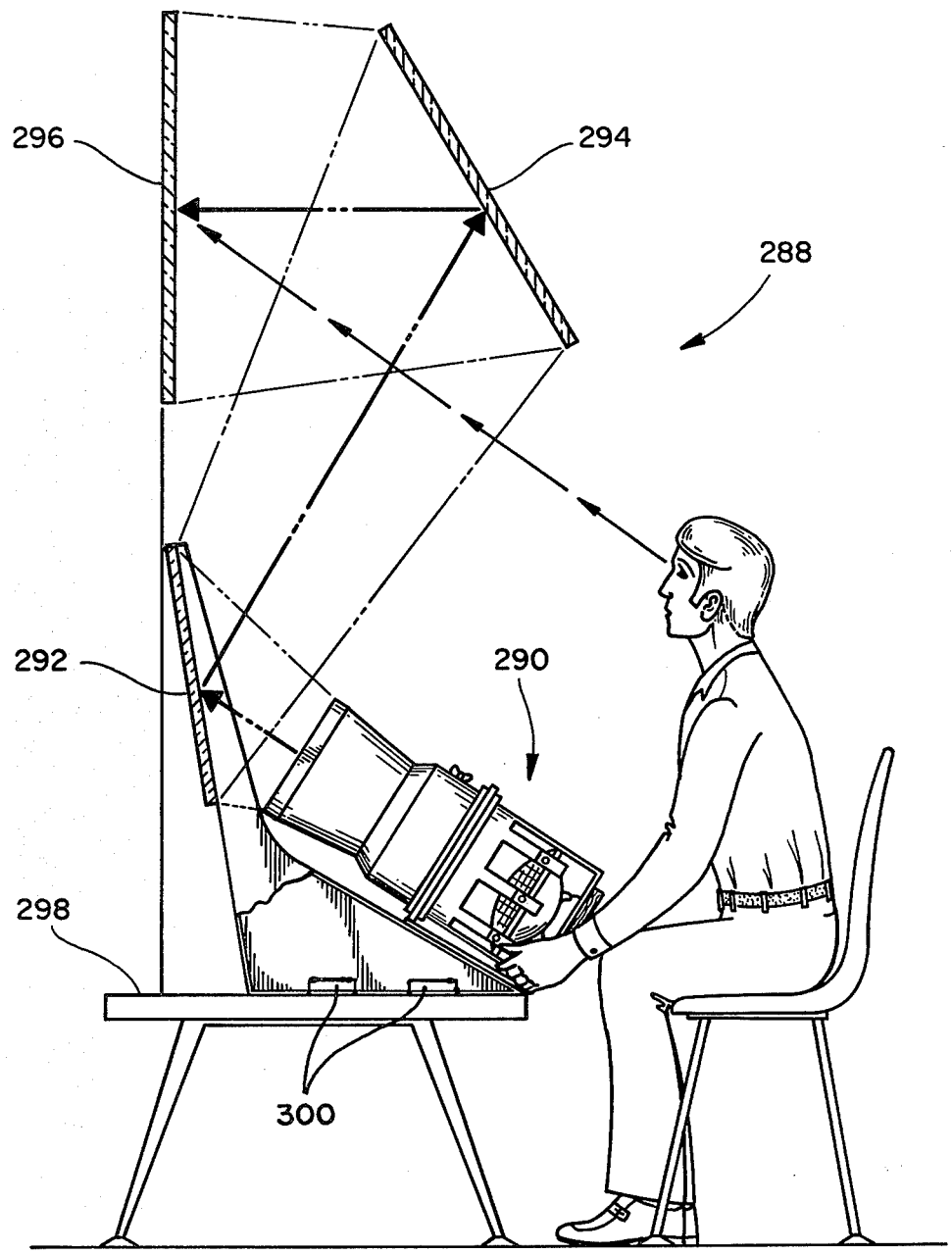
FIG. 13 is a side elevational view of a fixture with operator for optical alignment of a projection television system according to the invention.

For example, a fixture such as shown by FIG. 13 provides for the fast, efficient optical alignment of the component which requires major adjustments; that is, the image projection means 118 depicted in FIG. 6A. The fixture 288 includes the primary components of the projection television system described, including a first mirror 292, a second mirror 294, and a screen 296. The screen 296 differs from the projection screen 148 shown by FIG. 4A in that the image is projected on the "back" of the screen for image viewing, rather than through the screen, as with screen 148.

An image projection means 290 which is to be optically aligned with the television system is mounted on a platform 298 of fixture 288, as depicted, and is held in proper orientation by a number of locating members 300, two of which are indicated, and which can also serve as locking clamps to hold the image projection means firmly on the platform 298.

Figure 14:
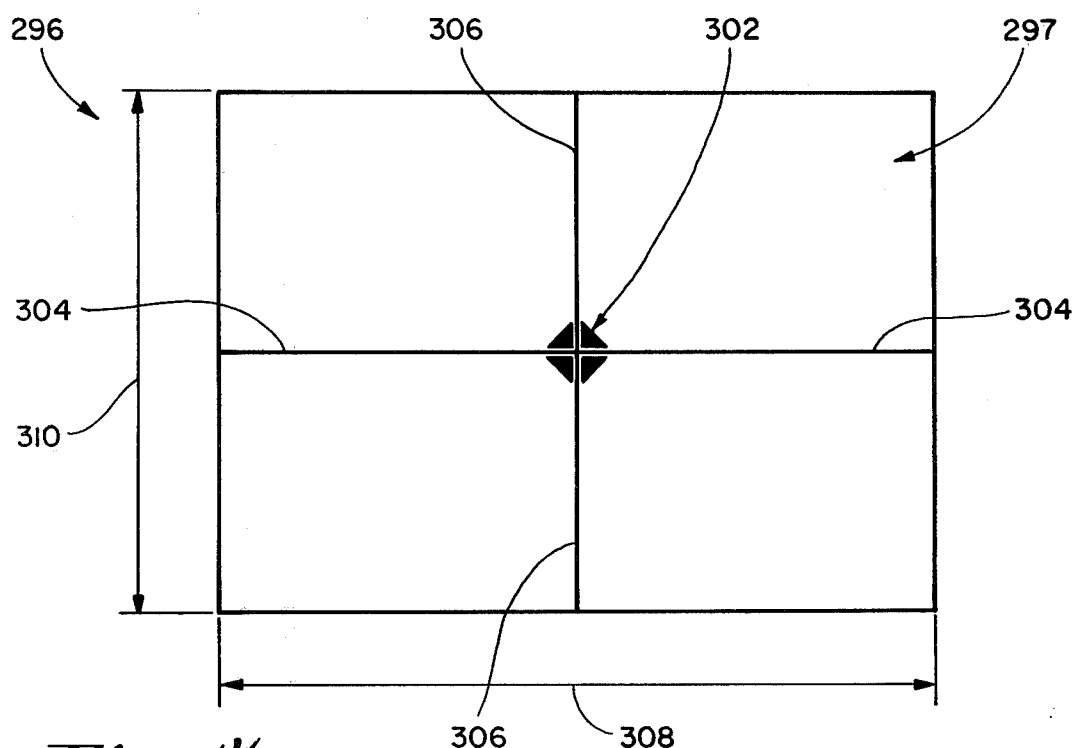
FIG. 14 is a plan view of a projection screen having target means used in the optical alignment method according to the invention.

With reference to FIG. 14, screen 296 has thereon a black-line target 297 having a center-screen marker 302 with horizontally and vertically extending lines 304 and 306 extending therefrom to the edges of the target. The preferred dimensions of the screen are 36 inches in width (ref. No. 308) and 27 inches in height (ref. No. 310). The opaque black-line target 297 depicted in FIG. 14 is for use with fixture 288. If a projection television system such as that shown by FIG. 4A is to be aligned in the field, for example, a transparent black-line target would be used for superimposition on the screen 148, and the alignment made by viewing the projected image from the front of the receiver.

The cathode ray tubes 120, 122 and 124 are removed from the respective pods 170, 172 and 174. In place of each of the tubes is inserted an assembly consisting essentially of a lamp means and a graticular geometrical analog of the respective image for the associated cathode ray tube. The lamp and the analogs are preferably embodied in a unitary CRT-surrogate assembly 312 indicated in FIG. 15. The lamp means 314 is depicted as being a round-beam automotive headlamp, such as a G.M. type 4001, 12 volt lamp, for example. The lamp 314 is indicated as being spaced apart from a frame 316 for holding the analog.

Figure 15:
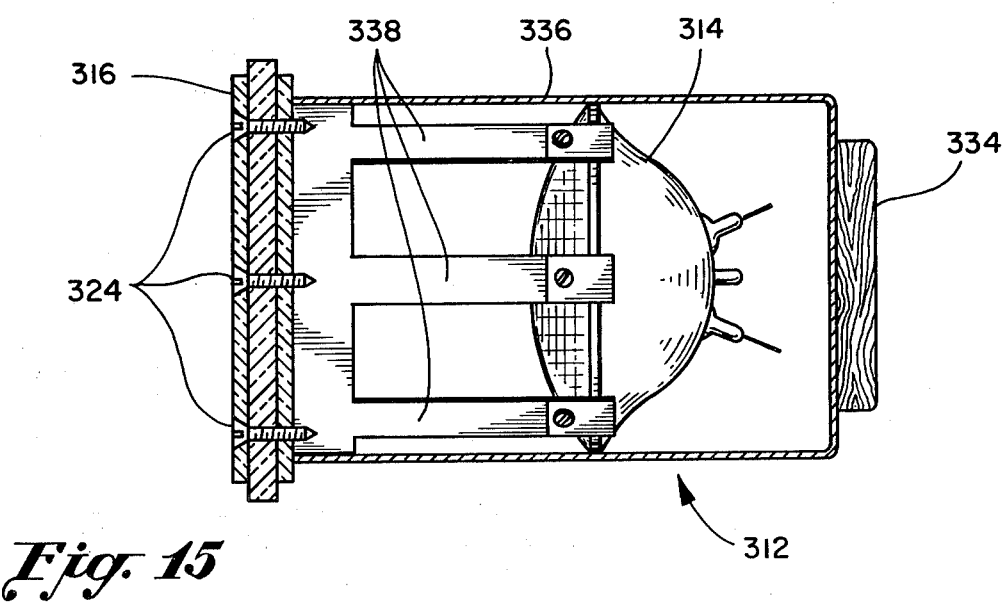
FIG. 15 is a side elevational view, partially cut away, of a light projection device used in a CRT-surrogate.
Figure 16:
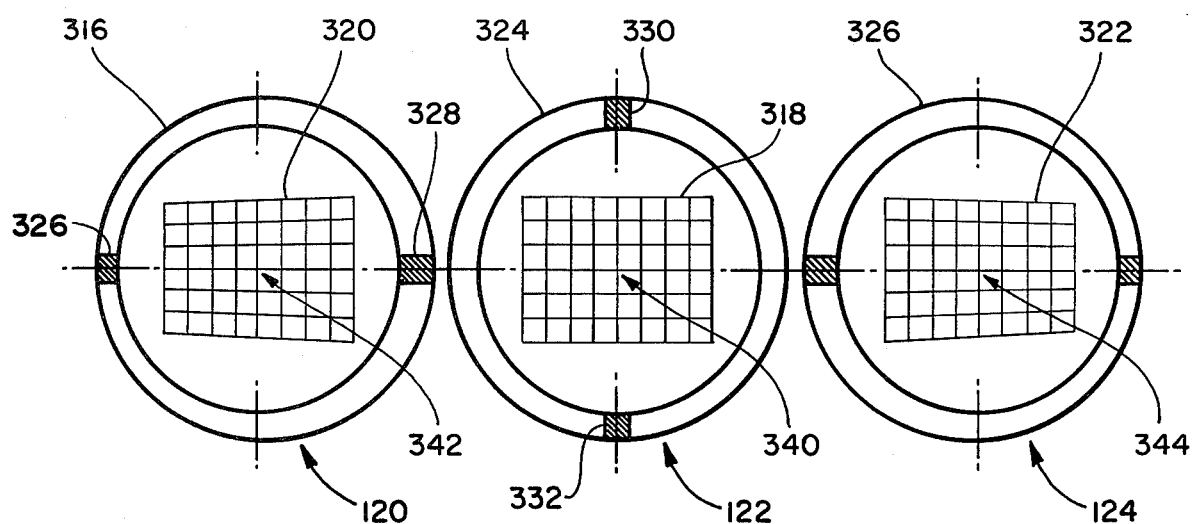
FIG. 16 is a plan view of graticular geometrical analogs of the light images formed by the three cathode ray tube screens of a projection television system.
Figure 17:
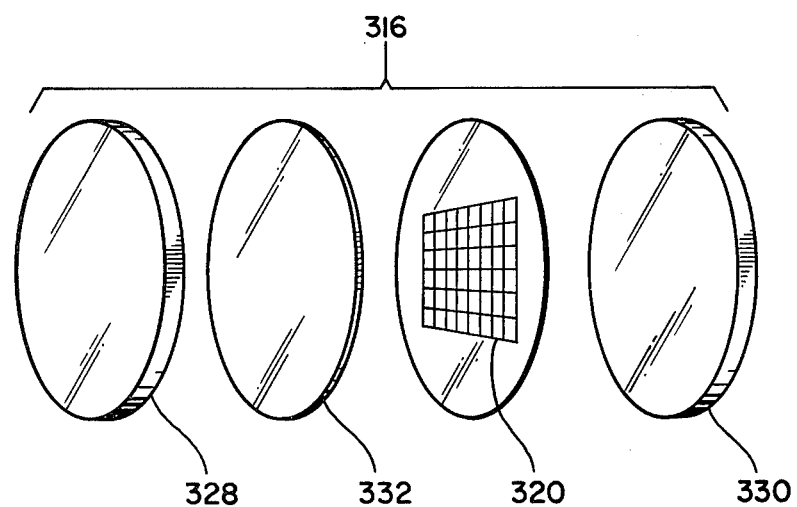
FIG. 17 is a perspective view showing in exploded array the components of a "sandwich" embodying one of the analogs of FIG. 16.

The analogs are depicted in FIG. 16 as being mounted in respective frames. The graticular geometrical analog 318 for use in the alignment of the central projection means which includes cathode ray tube 122, may project for example, a green image. The analog is indicated as being that of an undistorted rectilinear image projected by the on-axis light projection means. The graticular geometrical analogs 320 and 322 are indicated as being purposely distorted; that is, comprising oppositely directed trapezoids, and are provided as surrogates for the purposely distorted off-axis images which, when projected, are effective to substantially compensate, for the non-linear magnification distortion of the image resulting from the off-axis location. Each of the respective frames 316, 324 and 326 consist of a "sandwich" enclosing the respective analog, as indicated by FIG. 17, wherein there is shown the analog 320 for cathode ray tube 120, by way of example. The analog 320 is shown as being enclosed in a frame 316, indicated by the bracket. Analog 320 is indicated as being enclosed by transparent circular sections 328 and 330, which may consist of a transparent plastic material such as Plexiglass (TM). A red filter 332 in association with the respective analog 320 is provided for identifying analog 320 when it is projected on the screen. Similarly, a green or blue filter is provided for identifying respective ones of analogs 318 and 322. In lieu of a colored filter, the plastic material itself can be suitably tinted red, green or blue. As indicated by FIG. 15, the "sandwich" may be held together by a number of machine screws 324.

The frames 316, 324 and 326 are indicated as including keying members for properly rotationally orienting the CRT-surrogates and associated analogs in the respective pods 170, 172 and 174. For example, tabs 326 and 328 provide for mating with slots 236 and 238 of pod 176 shown by FIG. 7A. Similarly, tabs 330 and 332 provide for mating with respective slots 284 and 286 in pod 184, shown by FIG. 12A. To ensure insertion in proper rotational alignment, the tabs may be differently sized, as shown by tabs 326 and 328 in FIG. 16. The method according to the invention provides for interposing between the lamp of the central projection means which includes cathode ray tube 122, and the associated lens 128, the analog 318 of the undistorted image, and similarly interposing in the off-axis projection means respective ones of the analogs for the off-axis images.

The geometrical analogs are derived, essentially, by translating selected points on the projection screen to the image area of the face panel of the respective cathode ray tubes through the intermediary optical system. The selected points are then joined by lines to make the graticule. In making the derivation, the following are given dimensions of the projection screen;
dimensions of the CRT image areas;
lens magnification, M;
lens diameter, D;
lens speed, F;
angle of tilt, $\theta$, of the cathode ray tube with respect to the screen axis (angles A in FIG. 1, for example);
image distance (lens to viewing screen), Q;
object distance (cathode ray tube to lens), P;

where $$P = \frac{FD(M+1)}{M}$$

$$Q = FD(M+1)$$

$$TCL = P + Q = \frac{FD(M+1)}{M} = \text{total conjugate length.}$$

To find corresponding point Xs and Ys on the viewing screen corresponding to the point with coordinates Xc and Yc on the cathode ray tube face panel $$Xs = \frac{M(TCL)Xc}{((M+1)Xc \tan\theta - TCL)\cos\theta}$$

$$Ys = \frac{Yc \cos\theta}{Xc}$$

The method according to the invention includes providing of geometrical analogs consisting of transparent lines printed on an opaque film base.

With reference to FIG. 15, the CRT-surrogate 312 consists essentially of a "plug-in" device which fits into the respective pod in place of the cathode ray tube. For ease in handling, the CRT-surrogate may be equipped with a handle 334, indicated as being wood to provide a cool handling surface. The CRT-surrogate 312 is depicted as being supported and enclosed in a tubular member 336 made of mild steel. A series of clamps 338 provide for supporting the lamp 314, and spacing it from the frame 316. The frame-to-lamp spacing is not critical; the only requirement is that the lamp 314 be far enough away from the frame 316 and its plastic component so as not to thermally affect the plastic. The CRT-surrogate 312 may be equipped with a quick-release clamping device (not shown) for holding it firmly in the pod. Also, each lamp may be turned on and off by a conveniently located toggle switch.

The light projection means are boresighted according to the inventive method by consecutively projecting the analogs on the screen 296. The pod adjustment means consisting of the leveling wheels 198 are manipulated for adjustment in elevation, and the baseplates are rotationally moved and manipulated to provide adjustments in azimuth. In boresighting, the respective center points 340, 342 and 344 of analogs 318, 320 and 322, indicated as being at the intersection of two lines of the graticule, are visually centered respective to center-screen marker 302.

The respective images are then aligned by consecutively projecting the analogs on the screen 296, and adjusting the aforedescribed pod adjustment means to align the lines of the analogs with horizontally and vertically extending lines 304 and 306 of target 297. The images are superimposed by concurrently projecting the analogs on screen 296 and adjusting the pod adjustment means.

The lamp means 314 and the analogs, noted as being contained in the respective CRT-surrogates, are removed, and the respective cathode ray tubes are reinserted, completing the alignment procedure according to the inventive method. As a result, the images projected by the light projection means will be in substantial optical alignment each with the other, and with a black-line target 297 of projection screen 296.

Following alignment of an image projection means 118 by the method according to the invention, the projection means 118 may be installed in a projection television receiver with the certainty that optical alignment by mechanical means has been accomplished. The second mirror means 146 (see FIG. 5) may have to be adjusted to align the projected image with the screen 148; this is accomplished from outside the shroud 150 by rotating screw means 160, 164 and 166 to properly position second mirror 146 in azimuth and elevation.

Any remaining adjustments required are electrical, and are accomplished by adjustments of the controls on the control panel 346 (see FIG. 4A). A cross-hatch signal is used as the signal source and the screen 148, without a black-line target, is used as the monitor for the adjustments. The red, green and blue images are projected consecutively and each is adjusted for proper horizontal width, overall linearity, straight horizontal lines at the top and the bottom of the picture and the elimination of any keystoning. The benefit of the method according to the invention is that these final electrical adjustments can be made with the certainty that the image projection means is substantially optically perfect. Unless this certainty is established, alignment would be literally impossible, as there would be no means of knowing the source of the misalignment, whether optical or electrical, or a combination of both.

The method of optical alignment according to the invention is not limited to the jack-in-the-box projection television receiver shown and described, nor to systems having "tilted" cathode ray tube face panels. Other types of projection television systems having off-axis and an on-axis light projection means that require boresighting and adjustments of the light projection means in azimuth and elevation can benefit from the application of the inventive method. Use of the method brings about the major advantage heretofore described, which is the initial establishment of optimum optical alignment prior to making electrical adjustments. By this means, there is no possible indecision as to cause and effect, and doubt as to whether a misalignment is due to an optical condition, and electrical condition, or a combination of both.

While a particular method has been described, changes and modifications may be made without departing from the invention in its broader aspects, and therefore, the aim of the appended claims is to cover all such changes and modifications as fall within the true spirit and scope of the invention.

I claim:

1. A method for the optical alignment of a projection television system having a bank of three light projection means for projecting into coincidence red, green and blue images respectively to form a composite color image in space, and having a projection screen spaced from said light projection means for receiving and displaying said composite color image, the central one of said projection means having its projection optical axis congruent with the axis of said a projection screen for projecting an undistorted, rectilinear center image, with the adjacent, off-axis ones of said light projection means projecting purposely distorted off-axis images effective to substantially compensate, upon projection, for the non-linear magnification distortion of the image resulting from the off-axis location of said adjacent ones of said light projection means, each light projection means including cathode ray tube means for forming the respective image; pod means for receiving and holding said cathode ray tube means, and pod adjustment means for enabling pod adjustments to be made in azimuth and elevation; and lens means for projecting the respective image on said projection screen; the method of optical alignment comprising:

replacing the cathode ray tubes with lamp means;

interposing between said lamp means and said lens means a graticular geometrical analog of said undistorted center image in the pod of said central projection means, and analogs of said purposely distorted off-axis images in the pods of the off-axis light projection means;

consecutively and concurrently projecting said analogs on said screen and superimposing said images on said screen by manipulating said pod adjustment means;

removing said lamp means and said geometrical analogs, and re-inserting respective ones of said cathode ray tubes;

whereby the images projected by said light projection means will be in substantial optical alignment each with the other and with said screen.

2. The method according to claim 1 wherein said method includes the providing of black-like target means on said screen, including a center-screen marker with lines extending horizontally and vertically therefrom for aligning said geometrical analogs when projected.

3. The method according to claim 1 including the step of boresighting said light-projection means on said center-screen marker.

4. The method according to claim 1 including the providing of geometrical analogs consisting of transparent lines printed on an opaque film base.

5. The method according to claim 1 including the identifying of respective ones of said analogs by providing a red, green, or blue filter in association therewith.

6. A method for the optical alignment of a projection television system having a bank of three light projection means for projecting into coincidence red, green and blue images respectively to form a composite color image in space, and having a projection screen spaced from said light projection means for receiving and displaying said composite color image, the central one of said projection means having its projection optical axis congruent with the axis of said projection screen for projecting an undistorted, rectilinear center image, with the adjacent, off-axis ones of said light projection means projecting purposely distorted off-axis images effective to substantially compensate, upon projection, for the non-linear magnification distortion of the image resulting from the off-axis location of said adjacent ones of said light projection means, each light projection means including cathode ray tube means for forming the respective image; pod means for receiving and holding said cathode ray tube means, and pod adjustment means for enabling pod adjustments to be made in azimuth and elevation; and lens means for projecting the respective image on said projection screen; the method optical alignment comprising:

providing a black-line target in lieu of said screen having a center-screen marker with lines extending horizontally and vertically therefrom to the edges of said screen;

removing said cathode ray tubes from said pod means;

inserting lamp means in said pod means;

providing a graticular geometrical analog of said undistorted center image, and a graticular geometrical analog of each of said purposely distorted images;

associating red, green or blue filters with respective ones of said analogs for providing an identifying color;

interposing between said lamp means and said lens means of said central projection means said analog of said undistorted image; and similarly interposing in said off-axis projection means respective ones of said analogs of said purposely distorted off-axis images;

boresighting said light projection means by consecutively projecting said analogs on said screen and manipulating said pod adjustment means and centering the analog images with respect to said center-screen marker;

aligning said images with said screen by consecutively projecting said analogs on said screen, and adjusting said pod adjustment means to align the lines of said analogs with said horizontally and vertically extending lines of said screen;

concurrently projecting said analogs on said screen and adjusting said pod adjustment means to superimpose said images;

removing said lamp means and said analogs and re-inserting respective ones of said cathode ray tubes;

whereby the images projected by said light projection means will be in substantial optical alignment each with the other and with said black-line target of said projection screen.

* * * * *